F. A. FROGH.
TRACTOR.
APPLICATION FILED JULY 5, 1919.

1,347,502.

Patented July 27, 1920.
4 SHEETS—SHEET 1.

Inventor,
Fred A. Frogh
by H. S. Johnson
his Attorney.

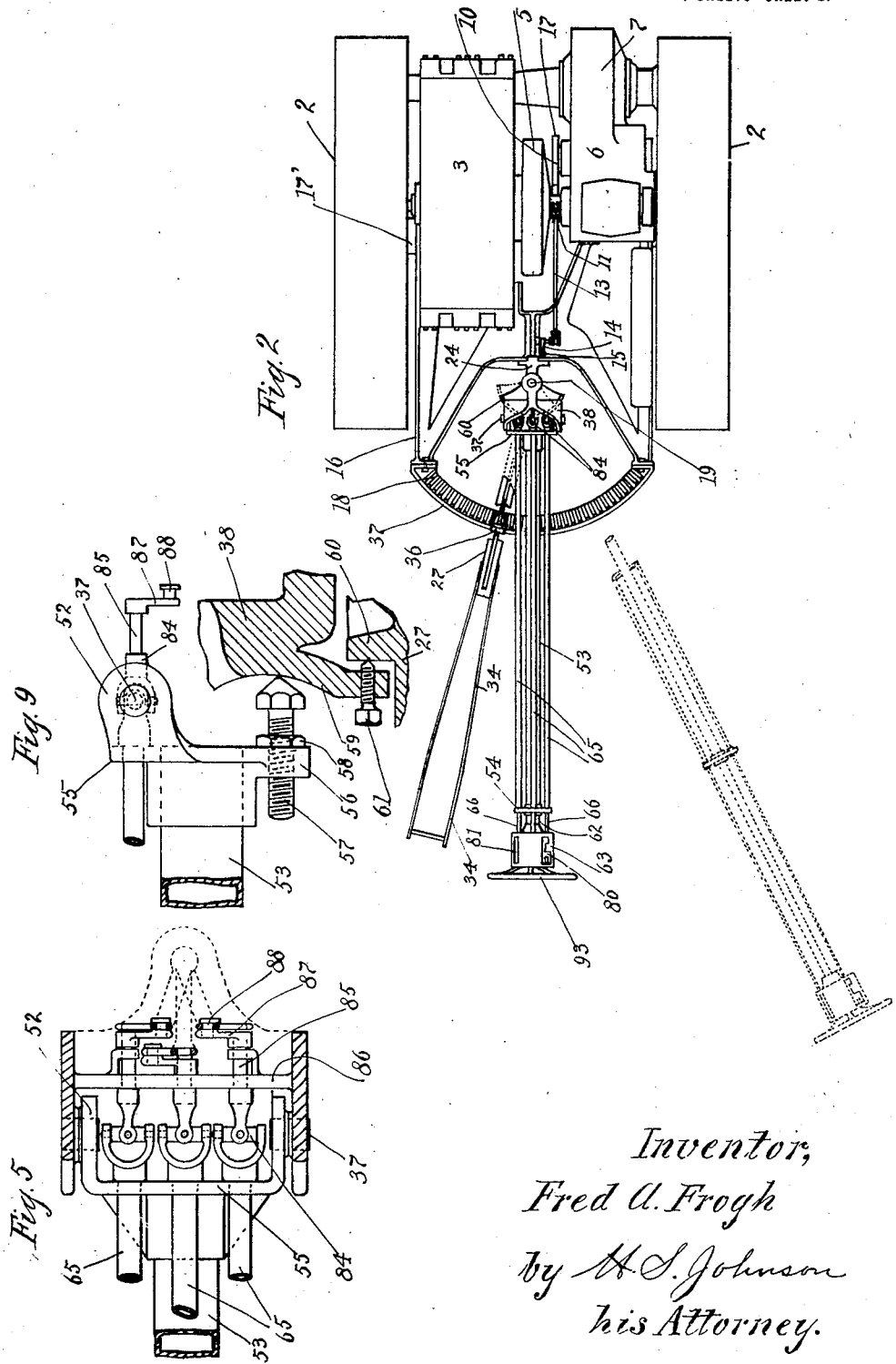

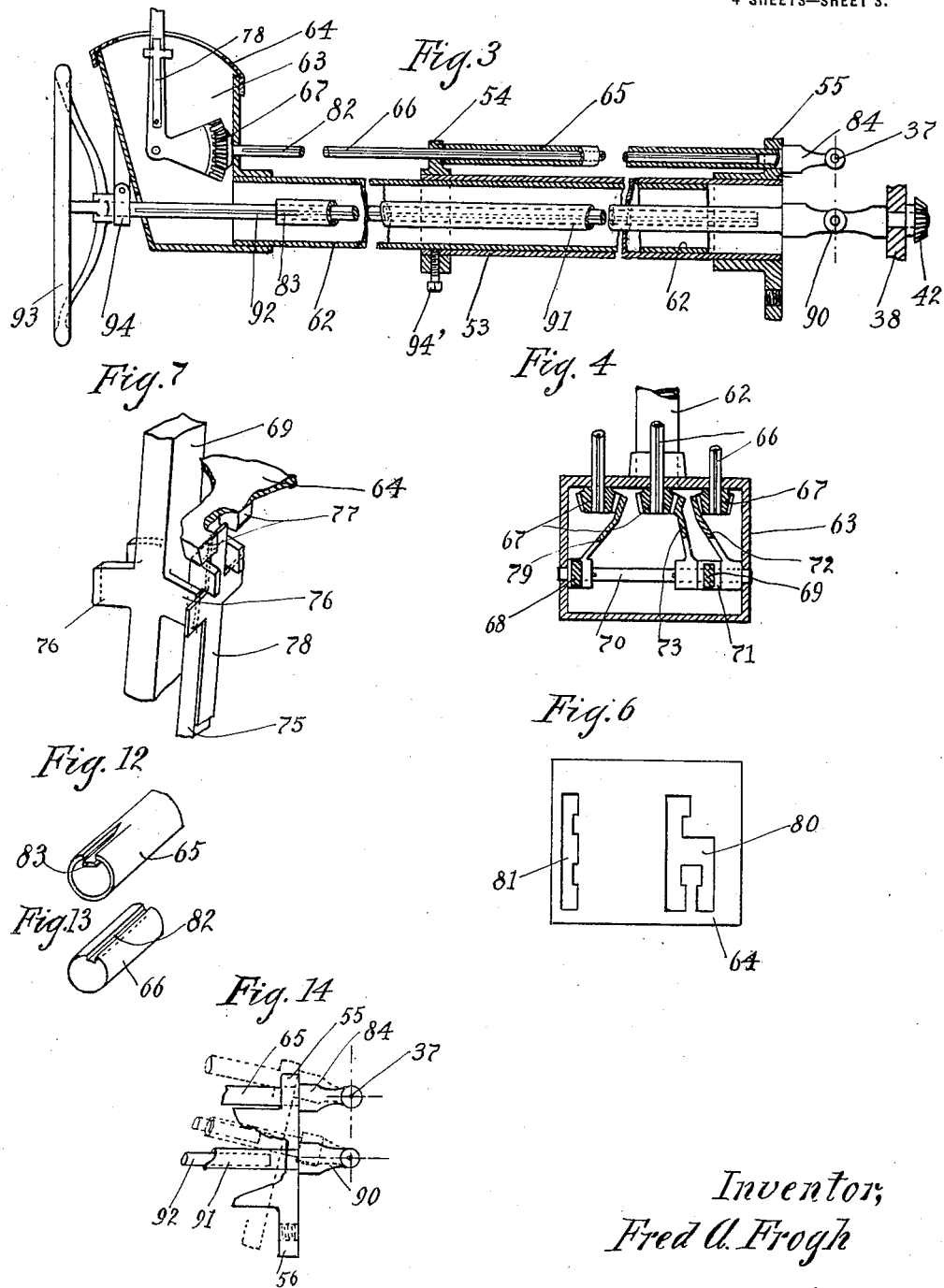

F. A. FROGH.
TRACTOR.
APPLICATION FILED JULY 5, 1919.
1,347,502.
Patented July 27, 1920.
4 SHEETS—SHEET 4.
Fig. 10
Fig. 11
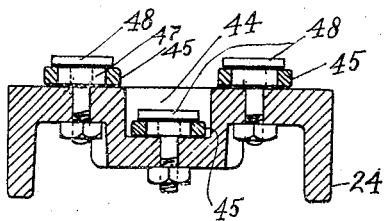
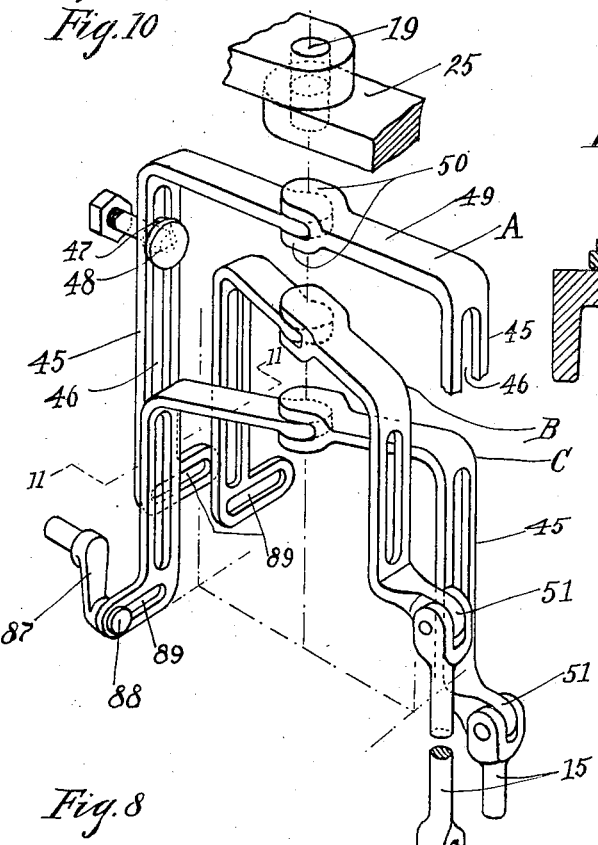
Fig. 8
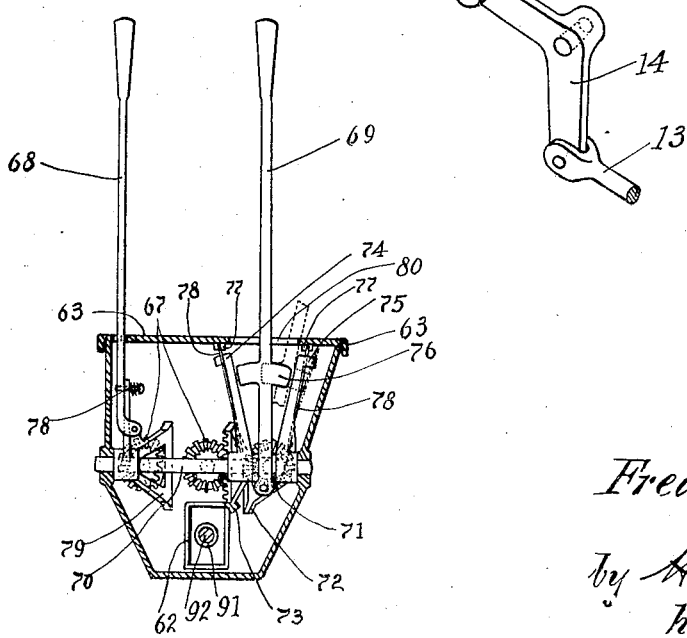
Inventor,
Fred A. Frogh
by H. S. Johnson
his Attorney.

UNITED STATES PATENT OFFICE.

FRED A. FROGH, OF ST. PAUL, MINNESOTA.

TRACTOR.

1,347,502.  Specification of Letters Patent.  Patented July 27, 1920.

Application filed July 5, 1919. Serial No. 308,692.

*To all whom it may concern:*

Be it known that I, FRED A. FROGH, a citizen of the United States, residing at St. Paul, in the county of Ramsey and State of Minnesota, have invented certain new and useful Improvements in Tractors, of which the following is a specification.

This invention relates to tractors for agricultural implements, and particularly to that type of tractor, wherein the power unit is supported and swings with the forward driving and steering wheels in turning, and is swively connected with the implement to be drawn thereby.

An object of the invention is to provide in a tractor, "built in" extensible controlling apparatus for controlling the power unit and steering the forward wheels, which can be shifted so that it may be operated from any point on the implement, and which may also be held, raised or lowered as desired, to conform to the various implements to be used.

A further object of the invention is to provide in a two wheel tractor supporting its power unit between its wheels and having its pivot between the wheels and the implement, certain novel features of construction for transmitting movement through said pivot from the hand operated steering apparatus to the power unit and the wheels, whereby said steering apparatus may be swung at random about said pivot irrespective of the implement.

A still further object of the invention is to provide connecting means between the hand operated controlling apparatus and the power unit and forward wheels, wherein the parts at the pivot loosely interlock to prevent binding, and at the same time permit the parts to accurately move relative to each other.

To this end the invention consists in the construction, combination and arrangement of parts hereinafter described and claimed.

Referring to the drawings:

Fig. 2 is a plan view of the same.

Fig. 3 is a longitudinal sectional view of a part of the hand operated controlling apparatus, partly broken away.

Fig. 4 is an enlarged horizontal section on line 4—4 of Fig. 1.

Fig. 5 is a horizontal section on line 5—5 of Fig. 1.

Fig. 6 is a plan view of the locking plate for the operating levers.

Fig. 7 is a fragmentary perspective view of a detail.

Fig. 8 is a section on line 8—8 of Fig. 1, some of the parts being shown in full.

Fig. 9 is a fragmentary side view of the pivot end of the controlling rods.

Fig. 10 is a fragmentary perspective view of the sliding transmitting yokes connecting the power unit with the controlling rods.

Fig. 11 is an enlarged sectional view on line 11—11 of Fig. 10 part of the frame being shown in section.

Figs. 12 and 13 are typical perspective views of parts of the controlling rods, and Fig. 14 is a fragmentary side view of the pivoted ends of the controlling rods.

Figure 1:
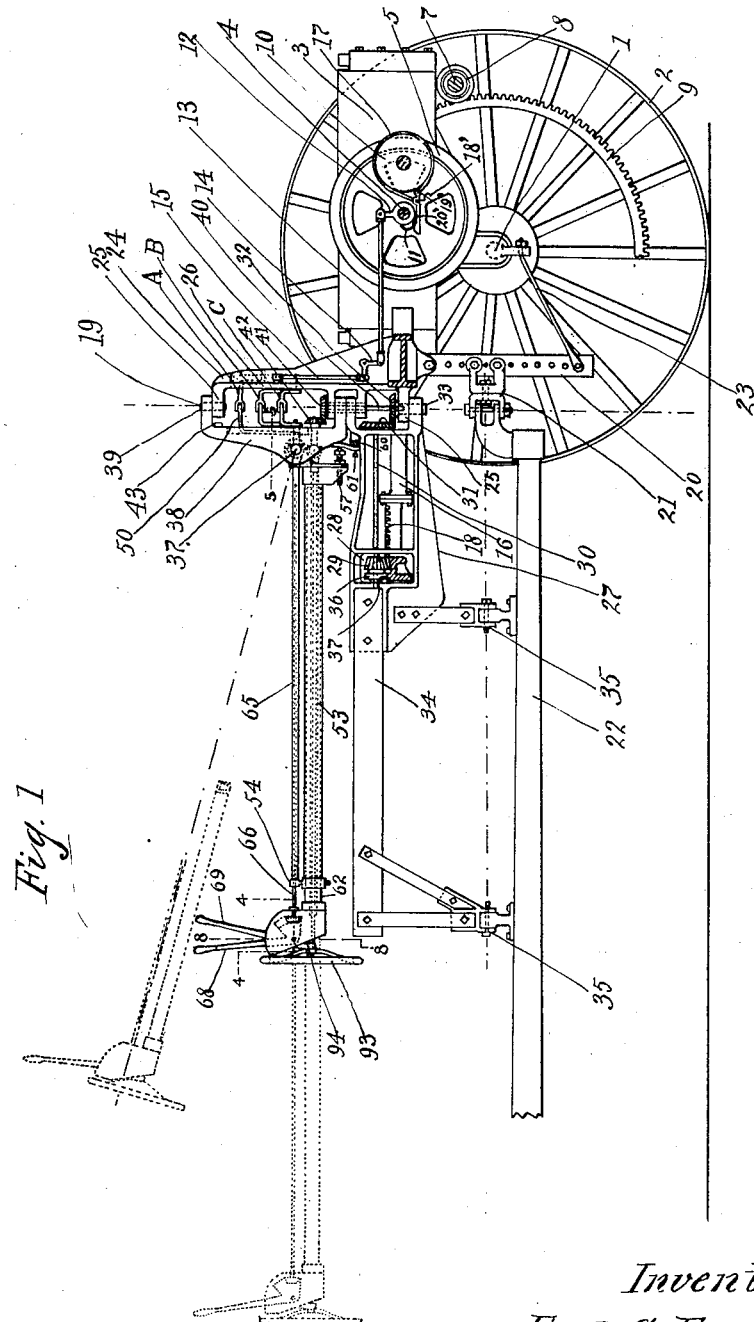
Figure 1 is a longitudinal sectional side elevation of a tractor embodying the invention.

Referring to the drawings, 1 designates the axle and 2 the driving wheels mounted thereon, the latter being operatively connected with the power mechanism so as to be driven thereby, all of the parts composing the power unit being supported by said axle and wheels and mounted in a manner to swing bodily therewith in the process of steering. The parts carried on the axle are the motor 3, the driving shaft 4, which latter has a clutch 5 connecting the motor with the transmission mechanism in the casing 6. The differential mechanism is represented by 7 and drives the pinions 8, which latter mesh with the gears 9 on the wheels. All of these parts are shown in a general way and may be of any suitable type or design. A band brake 10 is operatively connected with the transmission mechanism not shown and is operated by the cam 11 on the drive shaft 4. The cam arm 12, rod 13, bell crank 14 and rod 15 connect the cam 11 with mechanism to be hereinafter described. A movement of the cam operates the band 17 of the brake and simultaneously operates mechanism (not shown) whereby the clutch is operated to connect the power unit to the transmission mechanism, the band having connections 18' and 19' with a lever 20.

Any suitable type of brake and clutch may be used.

In the foregoing the control of the brake and clutch alone are described but the speeds of the engine may be likewise controlled.

Applicant has shown the bell crank 14 and rod connection 15 as one means of connecting his improved controlling apparatus with the power unit.

In the tractor illustrated in the drawings, a frame 16 is employed, the frame being connected with the axle by any suitable means such as the hub 17'. The frame is formed with an upwardly facing segment 18, the center thereof lying well within the space between the wheels and being midway between the latter. The center of the segment coincides with the pivot 19 of the tractor, about which the steering wheels and power unit rotate bodily when the machine is caused to deviate from a straight course.

Depending from the frame, between the pivot 19 and the axle is a drag bar 20 having a series of perforations adapted to receive the fastening bolts of the swivel connection 21, which in turn is pivotally connected with the draw bar or tongue 22 of the implement to be drawn. Suitable tie rods 23 connecting the draw bar with the axle serve to transfer the pull to the latter.

Preferably integral with the frame at a point adjacent the pivot 19, is a comparatively high standard 24, formed with four horizontally disposed and rearwardly extending lugs 25, arranged in a vertical row on the rearward face of the web 26. The lugs are bored so as to form journals for pivot pins to form the general pivot 19.

Pivotally hung on the lower two of said lugs and extending rearwardly and having forwardly extending lugs in alinement with the latter is the beam support 27 formed with a rectangular opening 28 near its outer end to loosely receive the toothed segment 18. Journaled in the beam support and disposed longitudinally thereon, and carrying rigidly a pinion 29, which latter meshes with the teeth of the segment is the horizontal shaft 30. At its forward end the shaft carries rigidly a bevel gear 31, meshing with the gear 32, the shank 33 of the latter serving as a part of the pivot pin for the pivot 19. Bolted to the rear of the beam support is the beam 34, preferably formed of two spaced longitudinal members suitably joined together at their outer ends. Supported from the beam are a pair of pivot connections 35 connecting the drawbar with the beam. The pivots 35 are arranged to permit the drawbar to swing in a vertical transverse plane, and are in alinement with the swivel connection 21, so that the implement is free to move relative to the driving wheels. The beam serves to connect the tractor with the implement so as to maintain the power unit bodily in normal position, or in other words, to keep the latter from tilting in a longitudinal vertical plane, and also permit the wheels to be rotated around the pivot 19. As shown, applicant employs preferably two points of attachment 35 with the drawbar 22 for this purpose. Obviously, when the gear 32 is caused to turn, the pinion 29 will travel over the segment 18, thereby turning the frame on its pivot and changing the direction of the driving wheels. A blank idler 36 is adapted to roll on the track 37, the latter preferably integral with the segment, serves to keep the pinion 29 properly meshed with the teeth of the segment.

Pivoted in the two upper lugs of the standard 24, as by means of forwardly extending bored lugs alining with said two upper lugs, and having a rearwardly offset pivot 37 intermediate its ends, is the swinging member 38. In the bore of the uppermost lug 25 and the uppermost lug of the swinging member is the pivot pin 39, while the bores of the lowermost lug of the swinging member together with the two intermediate lugs 25, and the upper lug of the beam support 27, rotatably contain the shank 40 of the bevel gear 41, said shank being firmly secured in the shank 33 of the gear 32 to drive the latter. The gear 41 meshes with a gear 42. In Fig. 5 is shown in cross section, the contour of the face 43 of the swinging member 38 opposite the rear face of the standard 24, both having a longitudinal flat bottomed centrally disposed recess 44, shown in Fig. 11. Mounted in the space between the standard and swinging member and capable of reciprocating vertically thereon, are a plurality of overlapping unconnected yoke members, each member extending through the zone traversed by the axis of rotation of the pivot 19. Each yoke member is formed with a slotted vertical leg 45, the slot 46 thereof rotatably receiving a roller 47 in a manner so that it may roll on the long walls of the slot, the roller being bored centrally to rotatably receive a headed screw threaded bolt 48, which latter pierces the wall on which it is mounted and is firmly held positioned by a nut fitting said thread. These rollers may be termed anti-friction rollers and any suitable number may be employed, one only being shown in Fig. 10, and one for each part shown in Fig. 11.

Each slotted leg 45 has an extension 49 at its upper extremity, said extension extending through and beyond the axis of the pivot 19. Each yoke member on one side of the pivot has a coöperating yoke member on the opposite side of the pivot, the extensions of coöperating yoke members being longitudinally in alinement, when the tractor is moving in a straight course. Each two cooperating yoke members form a complete yoke and are designated by the letters A—B and C. The extension of one of the yoke members of each yoke is bifurcated at its outer end, to form a pair of lugs 50. The outer end of the oppositely disposed yoke member fits slidingly between said lugs, so that when one yoke member is caused to move it will transmit its motion to its cooperating member. In the drawings the bifurcated yoke members are shown on the motor side of the pivot, each slotted leg thereof being formed with an outwardly extending lug 51, pivotally connected with the rod 15. In Fig. 1 the yoke B is shown operatively connected with the bell crank 14, which in turn (Fig. 2) is connected with the clutch and brake, so that any reciprocatory movement of the yoke will be transmitted to the brake and clutch.

The movement of the yokes and the swinging of the driving wheels is effected by a plurality of controlling rods operatively connected with hand operable mechanism all of which is collectively rotatable about the pivot 19 in a horizontal plane, and about the pivot 37 in a vertical plane, and either simultaneously or separately.

The controlling mechanism is journaled on the pivot 37, by means of a pair of forwardly extending ears 52, at the top and rearmost end of a comparatively long rearwardly extending tubular housing 53, the housing being preferably rectangular in cross-section and formed at each end on its upper side with a transverse upwardly extending flange 54 and 55 respectively. The housing fits with its ears 52 snugly between the sides of the swinging member 38, and has at its lower edge opposite said ears a lug 56, the latter being threaded to receive a lift screw 57 having a lock nut 58 whereby the screw may be locked in the lug against movement. The screw is disposed longitudinally with respect to the housing, and is adapted to abut against a lug 59 carried by the swinging member. Obviously a movement of the screw will cause the housing 53 to swing around the pivot 37 and thereby raise or lower the outer free end thereof as the case may be. The lug extends downwardly in close proximity to the top of the beam support 27, the latter being formed on its upper side with a semi-circular rib 60 adapted to be engaged on its peripheral vertical face by a set screw 61 screw threaded in the lug 59. When it is desired to swing the housing laterally, the set screw is withdrawn away from the flange 60 and the housing is then set so as to be directed toward any part of the implement desired, such as either side or the center thereof.

The set screw is then firmly set against the flange 60 when it is desired to lock the housing in position.

Telescopingly fitting the interior of the housing and slidable therein and capable of being extended outwardly and rearwardly therefrom, is the tubular inner housing 62 formed with a gear box 63 at its free end, a set screw 94' piercing the housing 53 is provided to clamp the inner housing in any desired position. The gear box extends a distance above the tubular body of the inner housing and has a curved cover 64 to serve as a closure for the top thereof.

Journaled in the flange 55 at their forward ends and abutting against the flange 54 at the other, are the tubular sections 65 of which three are shown, each section being telescoped through an aperture in the flange 54 by a rod 66, which latter extends through the forward wall of the gear box and is provided with a bevel gear 67 on its rearmost end in the interior of the gear box. The tubular section and rod may be termed a telescopic controlling rod.

Supported at its respective ends in the side walls of the gear box, and supporting rotatably the operating levers 68 and 69, is the transverse shaft 70. The lever 69 is pivotally mounted on a sleeve 71 in a manner enabling it to swing in a transverse plane relative to the rods 66. Adjacent each side of the sleeve 71, is rotatably mounted a gear segment 72 and 73 respectively, each having an upwardly extending arm 74 and 75 respectively, the two arms being oppositely inclined to permit the lugs 76 on the lever to be freely moved between them. Spaced stop blocks 77 (Fig. 7) arranged on the underside of the cover 64 to receive the cross shaped blade spring 78 with which each of the arms 74 and 75 is provided, serve to hold the latter in normal inoperative position. When the lever is thrown to the right or left, as the case may be, the lugs 76 press the spring outwardly out of engagement with the blocks 77 (shown in dotted lines Fig. 8) thereby enabling the operator to move either of the gear segments and in turn its respective gear 67 with which it meshes. The lever 68 is provided with spring means 78 to render it slightly bendable laterally, said lever being connected with the gear segment 79 which also meshes with one of the gears 67 to turn its respective rod.

Referring to Fig. 6, the cover 64 is perforated with openings 80 and 81 respectively, the opening 80 serving as a lever stop for the lever 69 and the opening 81 for the lever 68.

The three rods 65 have been given like numbers as have also the gears 67, because it is not thought necessary to designate the function of each rod and gear. As shown in Figs. 12 and 13 each of the rods 66 has a longitudinal key way 82 throughout its length while the tubular section 65 is formed with a spline 83 adapted to extend into said key way so that the rod and tubular section will rotate together, but is capable of being telescopically extended.

Each of the tubular sections of the telescopic controlling rods carries rigidly at its forward end a universal connection 84 connected with a stub shaft 85 the latter being journaled in a transverse partition wall 86 in the swinging member 38. On each stub shaft is rigidly mounted a crank arm 87 formed at its outer end with a headed wrist pin 88.

Referring to Fig. 10, the wrist pin is adapted to slide in a horizontal slot 89 at the base of the leg 45, whereby, when the crank arm is caused to turn the yoke is reciprocated vertically. As shown each yoke is provided with a slot 89 and has its respective crank arm. It will be noted (Fig. 5) that the two outside crank arms are arranged to extend in advance of the center crank arm. This is done to afford room for the center crank arm to operate as is plainly indicated in the drawings.

Referring now to Fig. 3, the bevel gear 42 is connected with the universal connection 90 the gear end of the latter being journaled in the wall of the swinging member, and the opposite end thereof being rigidly mounted on the tubular section 91. The tubular section 91 telescopingly supports the rod 92, the latter extending through an opening in the gear box and a distance beyond the latter and has a hand wheel 93 on its outer end. The rod 92 and tube 91 are splined and key seated as illustrated in Figs. 12 and 13, for the members 65 and 66.

A journal support 94 supported from the gear box holds the telescopic steering rod positioned centrally in the interior of the telescopic housing member. It will be noted, (Fig. 14) that when the controlling mechanism is swung upwardly upon the pivot 37 the rod 92 will be slightly withdrawn from the tubular member 91, as indicated in dotted line.

From a study of the foregoing disclosures it is seen that I have provided a construction in which all the elements for controlling the major functions of the tractor are brought together or centralized in the rear of the tractor where they can be conveniently reached by an operator on the following implement. More especially it will be seen that the construction is such that these major functions can be conveniently controlled by elements in easy reach of the operator of the following implement.

These features, taken in conjunction or combination with the feature of ability to adjust the controlling mechanism vertically, horizontally and longitudinally according to the height and location of the seat on the following implement, irrespective of the line of draft, and in conjunction with the feature that the controlling mechanisms swing from one side to the other in taking curves, go to the production of a unitary structure peculiarly adapted to control from the seat of the following implement.

In operation, when, for example, a wide seeder is being drawn on a return trip and the operator is standing on the rear platform thereof, it is highly desirable to be able to stand on the extreme end of the platform to enable the operator (who is also the driver) to watch the colter wheel so as to keep the latter in the track made on the up trip. Applicant's controlling apparatus may be conveniently swung to any desired position, the steering wheels being controlled by the hand wheel 93 and the power unit by the levers 68 and 69.

I claim:

1. In a tractor, the combination with the driving means and the steering means, the latter including a vertically disposed pivotal connection whereby it is connected with said driving means, the driving means being swingable around said pivotal connection of a member swingably mounted on pivot means, the pivot thereof being coincident with said pivotal connection and located above the latter said pivot means being supported by said driving means, rearwardly extendible controlling mechanism pivotally mounted on said member in such a way as to be swingable in an upwardly direction, operative connections from said controlling mechanism to the driving means and to the steering means, and means movable around said pivots irrespective of said controlling mechanism for connecting the driving means and the steering means with an implement.

2. In a tractor, the combination with the driving means and the steering means, the latter being pivotally connected with the rear of the driving means in a manner to render the latter swingable in a horizontal plane, a member pivotally supported on the driving means above said pivotal connection, the pivot thereof being coincident with said pivotal connection, a comparatively long supporting member extending rearwardly from said pivotally supported member and being pivotally mounted thereon so as to swing in an upwardly direction, controlling mechanism supported on said supporting member, said controlling mechanism having operative connections extending to the driving means and to the steering means, and screw threaded means extending from said supporting member to said pivotally supported member and located below the latter, whereby said supporting member is turned on its pivot when said screw threaded means is operated.

3. In combination with the driving means and the steering means of a tractor, part of said steering means being connected to the driving means by a vertically disposed pivotal connection, pivot mechanism including a horizontally swinging member located above said pivotal connection and supported by the driving means, the pivot thereof being axially coincident with the pivot of said pivotal connection, comparatively long rearwardly extending controlling mechanism mounted on a horizontally disposed pivot on said swinging member, said controlling mechanism being operatively connected with the driving means and with the steering means, and lifting means extending from said swinging member to said mounted controlling mechanism and located below said horizontal pivot for lifting said controlling mechanism to rotate it bodily around said horizontally disposed pivot, said controlling mechanism being supported solely on said swinging member.

4. In combination with the driving means and the steering means of a tractor, part of the steering means being pivotally connected to the driving means, to enable the driving means to be swung in a horizontal plane, rearwardly extending controlling mechanism pivotally supported and solely supported on the driving mechanism, the pivot thereof being arranged coincident with the pivot of said pivotal connection, and operative connections from said controlling mechanism to the driving means and to the steering means.

5. In combination with the driving means and the steering means of a tractor, part of the steering means being connected to the implement to be drawn, and part being pivotally connected with the driving means in such a way as to render the latter swingable in a horizontal plane, a rearwardly extending comparatively long supporting member pivotally supported and solely supported on the rear of the driving means at a point located above said pivotal connection, the pivotal support of the supporting member comprising a vertically disposed pivot in alinement with said pivotal connection and a horizontally disposed pivot arranged at right angles to said supporting member, adjustable means on the supporting member for sustaining the latter in extended position at varying angles relative to a horizontal plane, extensible controlling mechanism mounted on the supporting member, and operative connections from said controlling mechanism to the driving means and to the steering means.

6. In a tractor of the class described, a wheeled power mechanism, a member pivotally connected to the rear portion of said power mechanism to permit lateral swinging movement of said member and mechanism relative to each other, and rod like controlling devices for said power mechanism, part of which are located on said mechanism but all of which are supported solely thereon, and flexible means for connecting the respective parts of said controlling devices in a manner to permit lateral swinging movement of the same relative to each other.

7. In a machine of the class described, a power mechanism, a member pivotally connected thereto to permit lateral motion of the parts relative to each other, controlling devices for said mechanism consisting in part of two vertically slidable outwardly extending arms located respectively upon said mechanism and member, one of said arms having a horizontally disposed comparatively deep bifurcation in its end and the end of the other arm extending slidably into said bifurcation the overlapping portions of said arms being located in vertical alinement with the pivotal connection between the mechanism and member.

8. In a machine of the class described, a wheeled power mechanism, steering means therefor part of which is swivelly connected to said power mechanism to permit lateral motion of the parts relative to each other, controlling means for said mechanism located above said steering means and swingable around a pivot supported by said mechanism, said pivot being in substantial coincidence with said swivel connection, and operative connections from said controlling means to the steering means and to said power mechanism, said operative connections consisting in part of a two-part inverted U shaped yoke capable of being reciprocated vertically and yoke reciprocating means connecting the controlling means with one part of said yoke, said yoke parts being arranged to overlap each other in the path of the axis of rotation of said pivot.

9. In a machine of the class described, a driving means, a steering means part of which is supported by the driving means, said steering means consisting in part of a pivotal connection located at the rear of the driving means to permit the parts to move laterally relative to each other, hand operable rearwardly extending controlling mechanism pivotally supported above said pivotal connection by the driving means, the pivot of said pivotal support being in substantial coincidence with said pivotal connection, operative connections from said controlling mechanisms to the steering means and to the driving means, said controlling means consisting in part of a two-part hollow housing one part thereof telescoping into the other part, a part of the controlling mechanism supported on and moving with said telescoping part when the latter is withdrawn from the other part of said housing.

10. In combination with the driving means and the steering means of a tractor, part of the steering means being pivotally connected to the driving means, rearwardly extending controlling mechanism pivotally supported and solely supported by the driving mechanism and operative connections from said controlling mechanism to the driving means and to the steering means.

11. In a machine of the class described, a power mechanism, a member pivotally connected thereto to permit lateral motion of the parts relative to each other, controlling devices for said mechanism consisting in part of two vertically slidable oppositely disposed coöperating elements located respectively upon said mechanism and member, said members lockingly engaging each other when slid at a point intersected by the axis of rotation of said swivel connection, but being unconnected when said mechanism and member are moved relative to each other.

12. A machine of the class described, comprising a driving means, a steering means pivotally connected to the rear of the driving means so as to render the parts movable laterally relative to each other, and rearwardly extending controlling means pivotally supported and solely supported by the driving means so as to be independently movable in a horizontal plane with respect to the driving means and steering means.

13. A machine of the class described, comprising a driving means, and rearwardly extending controlling means for the driving means pivotally connected to the rear of the latter and solely supported thereby in such a way as to render the parts movable simultaneously in a lateral and upward direction.

14. A machine of the class described, comprising a wheeled power unit, a rearwardly extending beam pivotally connected to the rear of the power unit so that the parts are rendered movable laterally relative to each other, steering mechanism for the power unit part of which is supported by the beam and part by the power unit, and rearwardly extending controlling mechanism above the beam having pivotal connection with the power unit and supported solely by the latter said controlling mechanism comprising a hollow extensible supporting member, an extensible controlling rod extending through the hollow of said member and operative connections from said controlling rod to the steering mechanism.

In testimony whereof I affix my signature.

FRED A. FROGH.